Figure 3:
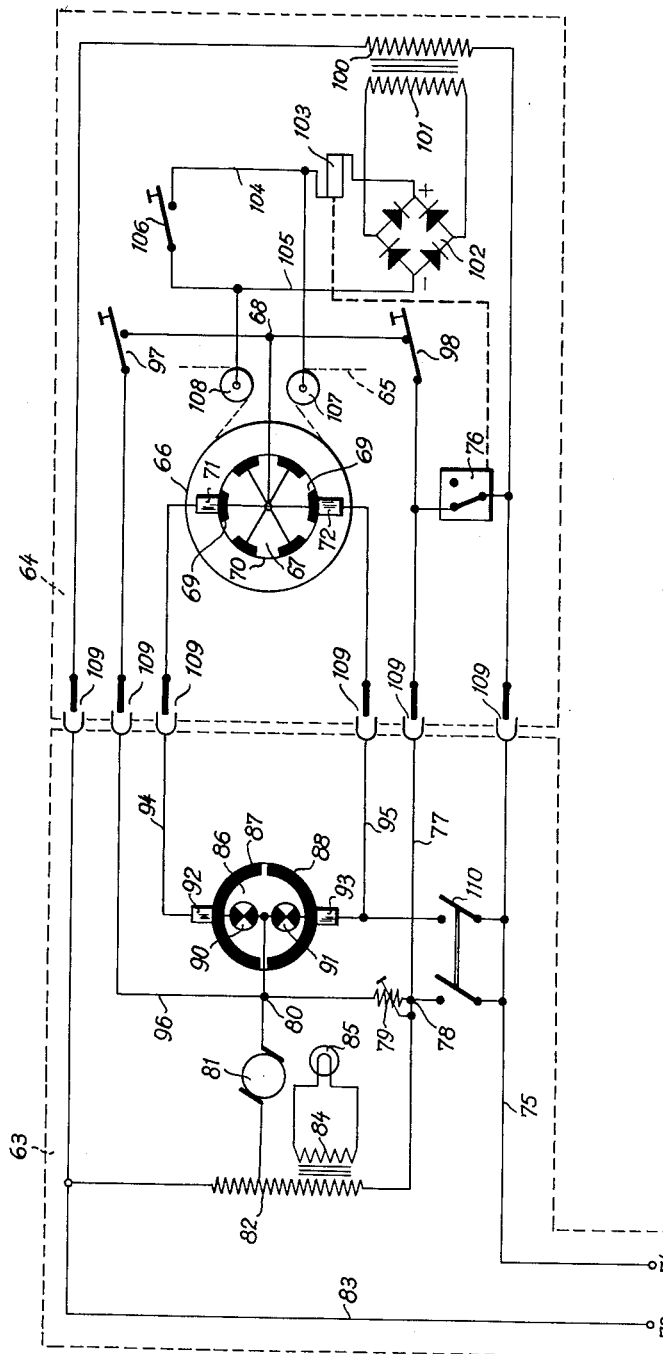

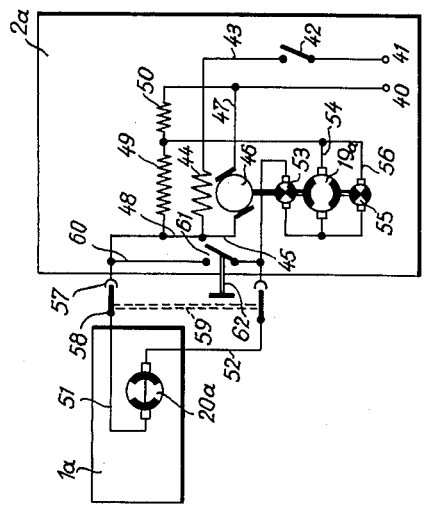
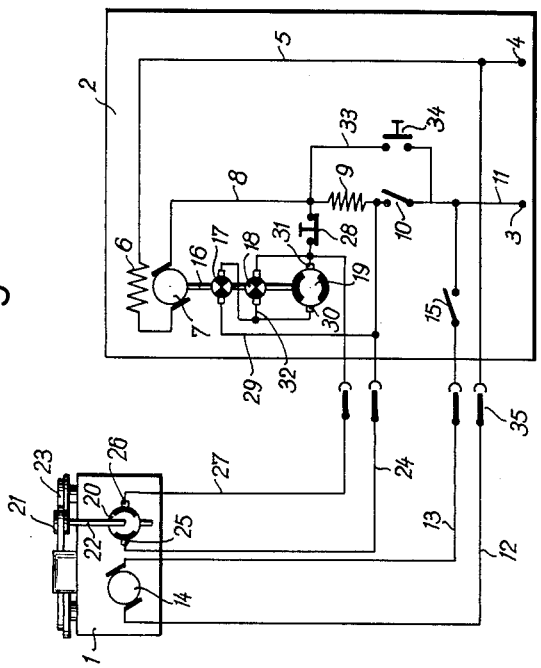

May 23, 1961   H. REINSCH ET AL   2,985,060
SOUND PROJECTOR ARRANGEMENT
Filed Sept. 11, 1957   2 Sheets-Sheet 2

INVENTORS
Herbert Reinsch
and
Siegfried Freiberger
BY: Michael S. Striker
ATTORNEY

United States Patent Office 2,985,060
Patented May 23, 1961

2,985,060
SOUND PROJECTOR ARRANGEMENT

Herbert Reinsch, Stuttgart, and Siegfried Freiberger, Ulm (Danube), Germany, assignors to Eugen Bauer G.m.b.H., Stuttgart-Unterturkheim, Germany Filed Sept. 11, 1957, Ser. No. 683,347

Claims priority, application Germany Sept. 12, 1956

12 Claims. (Cl. 88—16.2)

The present invention relates to a sound projector arrangement.

More particularly, the present invention relates to a sound projector arrangement in which the speed of a film projector unit is synchronized with the speed at which a sound reproducing unit operates.

There exist sound projector arrangements in which a suitable rotational speed-responsive switch device, such as a centrifugal switch, is used in order to enable the film projector to attain normal projection speed relatively quickly, whereupon the speed of the film projector can be synchronized to that of the sound reproducer. However, when such a film projector is operated independently of any sound reproducer, the speed of the projector has to be adjusted manually and unless this is done very expertly, there exists the great danger that the projector motor is accelerated either too slowly, which may cause the film to become charred or scorched, or too rapidly, which may cause the film to tear. Moreover, the average film viewer is accustomed to seeing films projected at precisely the proper speed, so that even a relatively small deviation from standard speed is objectionable.

It is therefore an object of the present invention to provide a sound projector arrangement wherein the above disadvantages are overcome.

It is another object of the present invention to provide a sound projector arrangement which incorporates a film projector that is adapted to be operated either independently or in conjunction with a sound reproducing unit.

The objects of the present invention also include the provision of a sound projector arrangement which incorporates a film projector which when operated in conjunction with a sound reproducing unit can be synchronized to the speed of the latter and which when operated independently will operate at a speed which is substantially constant and equal to that normally obtained during synchronous operation of both units.

It is a still further object of the present invention to provide a sound projector arrangement which incorporates a film projector unit that is adapted to be connected to and operated in synchronism with a sound reproducing unit, but which film projector unit can, if desired, be very easily disconnected from the sound reproducing unit and be operated independently thereof in such a manner that its speed is substantially constant and equal to the speed normally obtained during synchronous operation of both units.

With the objects in view, the present invention mainly consists in that improvement in a sound projector arrangement which comprises a sound reproducing unit, a film projecting unit, and combined synchronizing and speed governing means for synchronizing the speed of sound reproduction and the speed of film projection and also for maintaining the speed of film projection, when the film projecting unit is operated independently of the sound reproducing unit, substantially constant and equal to the speed normally obtained during synchronous operation of the units. These combined synchronizing and speed governing means may include, firstly, a controlling component associated with the sound reproducing unit and influenced by the speed of sound reproduction and a synchronized component associated with the film projecting unit and adapted to synchronize the speed of film projection of the latter depending upon operation of the controlling component, the controlling and synchronized components being connectable to and disconnectable from each other, and secondly, speed governing means which are associated with the film projecting unit for maintaining the speed of film projection, when the controlling component of the sound reproducing unit and the synchronized component of the film projecting unit are disconnected from each other, substantially constant and equal to the speed normally obtained during synchronous operation of the two units.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figs. 1 to 3 are diagrammatic representations of three embodiments of a sound projector arrangement according to the present invention.

Referring now to the drawings, and to Fig. 1 thereof in particular, there is shown a sound projector arrangement which incorporates a sound reproducing unit 1 and a film projecting unit 2. Both units are energized by way of input terminals 3, 4. A lead 5 connects the terminal 4 to one end of the field winding 6 of an electric motor which drives the film projecting unit 2, the opposite end of the field winding being connected to the motor armature 7. Another lead 8 connects the armature 7 to a resistor 9, and the latter is connected to the terminal 3, by way of a switch 10, by means of a lead 11 so that the resistor 9 is in series-circuit with the driving motor. The resistance of the resistor 9 is so selected that the speed of rotation of the motor is somewhat lower than the speed at which the motor must operate in order to operate the film projecting unit in synchronism with the sound reproducing unit.

Additional leads 12 and 13 are provided for connecting the motor 14 of the sound reproducing unit 1 to the leads 5 and 11, respectively, whereby the motor 14 is energized by a source of electrical energy connected to the input terminals 3 and 4. A switch 15 is incorporated in the lead 13.

The shaft 16 of the film projecting unit driving motor, to which the film advancing mechanism is mechanically connected in a manner well known in the art, also actuates two rotational speed responsive switches 17 and 18, which may be of the centrifugal switch type. The switch 18 is so arranged that it occupies its closed position when the motor rotates slower than a first control speed which is slightly below normal synchronous speed (i.e., the speed at which the motor must run in order to operate the film projecting unit in synchronism with the sound reproducing unit) but occupies its open position when the motor attains this first control speed, and the switch 17 is so arranged that it occupies its closed position when the motor rotates slower than a second control speed which is slightly above normal synchronous speed but occupies its open position when the motor attains this second control speed.

The shaft 16 also has mechanically connected to it an interrupter 19, so that the latter moves between open and closed positions at a rate dependent upon the rotational speed of the motor.

The sound reproducing unit includes another interrupter 20 which is mounted on a rotatable spindle 22, the latter also carrying a roller 21. The sound carrier, which may be in the form of wire or a strip of magnetic tape, is wound about the roller 21 so that the latter is rotated by the sound carrier. Consequently, the interrupter 20 is moved between its open and closed positions at a rate which is directly proportional to the speed of sound reproduction.

A lead 24 connects one stationary contact 25 of the interrupter 20 to a point intermediate the resistor 9 and the switch 10, the other stationary contact 26 of the interrupter 20 being connected to the lead 8 by way of a lead 27 and a normally closed switch 28.

A lead 29 connects the lead 24 to one terminal of the rotational speed responsive switch 17, the opposite terminal of which is connected to one stationary contact 30 of the interrupter 19. Another stationary contact 31 of this interrupter is connected to the lead 27 and the switch 28. The rotational speed responsive switch 18 is connected in parallel with the interrupter 19 by means of a connection 32.

Furthermore, a normally open switch 34 is connected between the leads 8 and 11 by means of a connection 33.

In order to commence operation of the two units, the switches 10 and 15 are closed. Inasmuch as at that instant both of switches 17 and 18 occupy their closed position, the resistor 9 is short-circuited so that maximum current can flow through the armature 7 of the film projecting unit driving motor. Consequently, the motor is accelerated relatively rapidly until it rotates at the above-mentioned first control speed, at which time the switch 18 opens so that speed control is taken over by the interrupters 19 and 20. These two interrupters then cooperate with each other in such a manner as to so short-circuit the resistor 9 that the film projecting unit is operated in synchronism with the sound reproducing unit.

If it is desired to slow down the film projecting unit driving motor for any reason, all that need be done is to open the switch 28. In this way, the switches 17, 18 and interrupters 19, 20 are rendered incapable of short-circuiting the resistor 9. Conversely, if it is desired to accelerate the motor independently of the switches 17, 18 and interrupters 19, 20, the resistor 9 may be short-circuited by closing the switch 34. The resistor 9 forms therefore speed reducing means for the motor.

It may occur, however, that if the switch 34 is held closed too long, the motors 6, 7 will tend to accelerate to a speed at which the interrupters 19, 20, by themselves, are incapable of synchronizing the motor speed to the speed of sound reproduction. This result is avoided by the switch 17 which opens as soon as the motor attains the above-mentioned second control speed. This eliminates the interrupter 19 from the circuit so that only the interrupter 20 is in parallel with the resistor 9. Thus, when the switch 34 is finally opened, the interrupter 20 alone serves to short-circuit the resistor 9 independently of the action of the interrupter 19. This means that so long as the switch 17 is open, the motor 6, 7 will receive full line voltage for not more than half the time, so that the motor will be slowed down until it approaches normal synchronous speed, and as soon as the second control speed is reached the switch 17 will close and this will enable the interrupters 19 and 20 to cooperate with each other to produce synchronous operation of both units.

According to the present invention the film projecting unit 2 is adapted to be operated independently of the sound reproducing unit 1. To this end the electrical connections between the two units are in the form of detachable connections 35, and it will be seen that upon electrical separation of the two units the interrupter 20, which of the components in the circuit which automatically short-circuits the resistor 9 is the only one that is directly associated with the sound reproducing unit, will be disconnected from this circuit. This leaves the control circuit for automatically short-circuiting the resistor 9 as a series-circuit incorporating (a) the resistor 9 itself, (b) the switch 17, and (c) the parallel circuit constituted by the switch 18 and the interrupter 19. Thus, when the switch 10 is closed, the resistor 9 will at first be short-circuited by way of the switches 17 and 18, thereby permitting full line voltage to be impressed across the motor so that the motor accelerates relatively rapidly. As soon as the motor attains the first control speed, switch 18 assumes its open portion, so that the resistor 9 will be short-circuited, by way of the switch 17 and the interrupter 19, only one half the time. If, then, for any reason the speed of the motor increases further until the second control speed is attained, switch 17 will assume its open position, so that no further short-circuiting of the resistor 9 takes place. This will cause the motor to slow down, so that it will finally assume a constant speed which is intermediate the first and second control speeds, which constant speed is substantially equal to the speed at which the motor drives the film projecting unit 2 during synchronous operation of the unit 2 with the sound reproducing unit 1.

In the embodiment shown in Fig. 2, the film projecting unit 2a is connected to a source of electrical energy at input terminals 40 and 41, the latter being connected by a lead 43 incorporating a switch 42 to one end of the field winding 44 of the film projecting unit driving motor, the opposite end of the field winding 44 being connected to one terminal of the motor armature 46 by way of a lead 45. The other terminal of the armature 46 is connected to the input terminal 40 by means of a lead 47.

Two serially-connected resistors 49 and 50, of which the former has a higher resistance than the latter, are connected in parallel across the armature 46, a lead 48 being provided for this purpose.

The sound reproducing unit 1a, which may be energized independently of the unit 2a or may have a motor (not shown) connected to the leads 40, 41 of the unit 2a in a manner similar to that shown in Fig. 1, incorporates an interrupter 20a which is moved between its open and closed positions are at a rate dependent upon the speed of sound reproduction. The mechanism whereby this is accomplished may also correspond to the construction shown in Fig. 1. One stationary contact of the interrupter 20a is connected to the lead 48 by means of a lead 51, and the other stationary contact of the interrupter is connected by means of a lead 52, to one terminal of a rotational speed responsive switch 53, the opposite terminal of the switch 53 being connected to an interrupter 19a which, as in the above-described embodiment, moves between open and closed positions at a rate dependent upon the rotational speed of the motor. The interrupter 19a is also connected, by means of a lead 54, to a point intermediate the resistors 49 and 50. Another rotational speed responsive switch 55 is connected in parallel with the interrupter 19a, a connection 56 being provided for this purpose.

The switch 53 is so arranged that it occupies its open position when the motor rotates slower than a first control speed, which, as in the above-described embodiment, is a speed slightly below normal synchronous speed, but occupies its closed position when the motor attains this first control speed. The switch 55 is so arranged that it occupies its open position when the motor rotates slower than a second control speed which, as above, is a speed slightly above normal synchronous speed but occupies its closed position when the motor attains this second control speed.

The leads 51 and 52 incorporate detachable connectors which may be in the form of sockets 57 and prongs 58, and the prongs 58 are carried by a body 59. Those portions of the leads 51 and 52 which are part of the film projecting unit 2a are connected to each other by a conductor 60. The latter incorporates a switch 61 which is continuously urged to its closed position, but which is provided with an actuator 62 by means of which the switch may be maintained in its open position. The actuator is in the form of a rod or the like the outer end of which is so positioned as to be engaged and pressed inwardly by the body 59 when the prongs 58 are inserted into their respective sockets 57. In this way, the switch 61 acts as an interlock which automatically opens the electrical connection between the leads 51 and 52 when the interrupter 20a of the sound reproducing unit 1a is electrically connected to the film projecting unit 2a and which automatically closes the electrical connections between the two leads when the interrupter is disconnected. Thus, the interrupter 20a is, through the intermediary of the interlock switch 61, connectable to the series-circuit incorporating (a) the resistor 49, (b) the switch 53, and (c) the parallel circuit formed by the switch 55 and the interrupter 19a, in such a manner as to be included in this series-circuit and so as to form one of the series-circuit components thereof.

When the two units are to be operated in synchronism, the prongs 58 are plugged into the sockets 57, the sound reproducer is energized in any suitable manner, and the switch 42 is closed. Since the switches 53 and 55 are open, the resistor 49 which is in parallel with the motor armature 46 cannot be short-circuited so the motor will be accelerated relatively rapidly until it attains the above-mentioned first control speed. At that instant the switch 53 closes so that the resistor will be short-circuited whenever the interrupters 19a and 20a are simultaneously in their closed positions. In this way, the speed of the motor will be synchronized to the speed at which the sound reproducing unit operates.

If, for any reason, the speed of the motor becomes too high, i.e., if the speed reaches the above-mentioned second control speed, the switch 55 closes thereby short-circuiting the interrupter 19a. When this occurs, the resistor 49 will be short-circuited by the interrupter 20a one half of the time, and this, in turn, causes a substantial proportion of the current to by-pass the motor armature, thereby slowing down the motor, so that synchronous operation is maintained.

When the film projecting unit 2a is to be operated independently of the sound reproducing unit 1a, the prongs 58 are withdrawn from the sockets 57. As set forth above, this permits the switch 61 to assume its closed position so that the resistor 49 is in a series circuit with (a) the switch 53 and (b) the parallel circuit formed by the switch 55 and the interrupter 19a. Thus, upon closing of the switch 42 the switch 53 prevents any short-circuiting of the resistor 49 until the first control speed is attained. When this speed is reached the switch 53 closes so that the resistor 49 is short-circuited by the interrupter 19a one half of the time. If the motor speed then increases further until the second control speed is reached, the switch 55 will also close, so that the resistor is completely short-circuited and this, in turn, causes the motor to slow down, so that it will finally assume a constant speed which is intermediate the first and second control speeds, which constant speed is substantially equal to the speed at which the motor drives the film projecting unit 2a during synchronous operation of the units 2a with the sound reproducing unit 1a.

Fig. 3 shows a sound projector arrangement in which a film projecting unit 63 is to be synchronized with a sound reproducing unit 64 which may be energized independently of the unit 63 or may be suitably connected to it in a manner similar to that shown in Fig. 1. The sound reproducer includes a roller 66 about which the sound carrier 65 is wound, and this roller drives an interrupter 67 which is provided with a plurality of pairs of opposite contacts 69, all of which are connected to a common point 68. The contacts cooperate with a pair of stationary contacts 71, 72 which are in the form of brushes arranged diametrically opposite each other.

The film projecting unit 63 is provided with a pair of input terminals 73, 74, the latter being connected by means of a lead 75 to one terminal of a relay 76, the latter being of the type that upon actuation moves into and maintains its new position. As can be seen from Fig. 3, the relay 76 forms part of the sound producing unit 64. Another lead 77 connects the opposite terminal of the relay 76 to a point 78 of the unit 63, to which one terminal of the armature 81 of the film projecting unit driving motor is connected by way of a variable resistor 79, the reference numeral 80 being used to indicate a point intermediate the armature 81 and the resistor 79. The other terminal of the armature 81 is connected to an intermediate point of a winding 82 which is connected at one of its ends to the input terminal 73 by way of a lead 83 and which is connected at its other end to the point 78. The winding 82 serves as a primary winding of a transformer the secondary winding 84 of which is connected to a lamp 85 by means of which the image of the film running through the unit 63 is projected onto a viewing screen or the like.

The motor 81 drives an interrupter 86 which comprises two rotating contacts 87 and 88 which cooperate with two stationary brushes 92 and 93. The contact 87 is connected to one contact of a rotational speed responsive switch 90 and the contact 88 is connected to one contact of another rotational speed responsive switch 91, the opposite contacts of both of switches 90 and 91 being connected to the point 80. The switch 90 is so arranged that it occupies its closed position when the motor rotates slower than a first control speed, which, as in the above-described embodiments, is a speed slightly below normal synchronous speed, but occupies its open position when this first control speed is attained. The switch 91 is so arranged that it occupies its closed position when the motor rotates slower than a second control speed, which, as above, is a speed slightly above normal synchronous speed, but occupies its open position when the motor attains this second control speed.

The brushes 92 and 71 are connected to each other by a lead 94, and the brushes 93 and 72 are connected to each other by another lead 95. A further lead 96 is provided between the points 80 and 68, a normally open switch 97 being incorporated in the lead 96. The point 68 is also connected to the lead 77 by way of a normally closed switch 98.

The leads 83 and 75 are extended within the unit 64 and are connected at their ends to the primary winding 100 of a transformer located in the unit 64. The secondary winding 101 of this transformer is connected to a relay controlling circuit incorporating a full wave rectifier 102, two leads 104 and 105, a relay 103, a normally open switch 106 for closing the relay controlling circuit, and a pair of electrically conductive contact rollers 107 and 108 over which a sound carrier utilized by the sound reproducing unit passes, the rollers 107 and 108 being connected, respectively, to the leads 104 and 105. The relay 103 is connected to the relay 76 in such a manner that whenever the relay 103 is energized, it causes the relay 76 to move into and remain in the position opposite from the one it previously occupied, i.e., if the relay 76 is in the position shown in Fig. 3 wherein it electrically connects the leads 75 and 77, energization of the relay 103 and consequent actuation of the relay 76 will cause the latter to assume and remain in the position wherein it does not electrically connect the leads 75 and 77, whereas when the relay 76 is in this last-mentioned position, energization of the relay 103 will cause the relay 76 electrically to connect the leads 75 and 77.

The film projecting unit 63 further includes a double pole switch 110 which, when in closed position, electrically connects the lead 75 to the point 78 as well as to the lead 95.

As is clearly shown in Fig. 3, each of the leads 75, 77, 95, 94, 96, and 83 incorporates a detachable connector 109, all of which may, if desired, be incorporated in a common multiple plug so as to facilitate the electrical coupling and uncoupling of the two units to and from each other.

In order to start operation of the sound projector arrangement, the sound reproducer unit 64 is turned on so that the carrier strip 65 drives the roller 66. The strip 65, which for purposes of obtaining automatic starting and stopping of the film projecting unit motor 81, is of an electrically non-conductive type, carries a metallic strip of such length as will enable it simultaneously to contact both rollers 107 and 108, thereby electrically connecting the same so as to energize the relay 103. This in turn causes the relay 76, which heretofore occupied the position wherein the leads 75 and 77 are not connected to each other, to move into the position shown in Fig. 3 so that the armature 81 is connected across the input terminals 73, 74. At the outset the switches 90 and 91 are closed so that the resistor 79, which is in series with the armature 81 and the input terminals 73, 74, is short-circuited by way of the switches 90 and 91, the contacts 87 and 88, the leads 94 and 95, one of the pairs of opposite contacts 69, point 68, the normally closed switch 98, and lead 77. As soon as the motor attains the above-mentioned first control speed, the switch 90 opens, so that short-circuiting of the resistor 79 can no longer be accomplished by way of the contact 87. Thus, the resistor 79 will be short-circuited in a manner depending upon the interaction of the interrupters 67, 86, i.e., either longer or shorter depending on whether the motor 81 rotates slower or faster than synchronous speed. If for any reason the motor attains the above-mentioned second control speed, the switch 91 will also open so that the resistor 79 is no longer short-circuited by the interrupters.

If desired, the motor 81 may be accelerated independently of the interrupters 67, 86 and switches 90, 91 by closing the normally open switch 97, inasmuch as this will short-circuit the resistor 79 by way of the lead 96, switch 97, point 68, the normally closed switch 98 and lead 77. Conversely, the motor may be slowed down independently of the interrupters 67, 86 and switches 90, 91 by opening the switch 98, inasmuch as this will prevent automatic short-circuiting of the resistor 79.

Also, the film projecting unit 63 may be turned on or off independently of the carrier strip 65 by closing the switch 106 inasmuch as this will energize the relay 103, thereby causing the relay 76 to shift its position.

Finally, the carrier strip 65 may carry another metallic strip which electrically connects the rollers 107 and 108 for automatically shutting off the film projecting unit as soon as any desired point on the sound carrier 65 is reached.

The film projecting unit 63 can be operated independently of the sound reproducing unit 64 when the six leads 75, 77, 95, 94, 96 and 83 are detached at the connectors 109. This is accomplished by closing the switch 110, thereby connecting the points 78 as well as the brush 93 to the lead 75 and thus to the input terminal 74. The interrupter 86 is thereby connected in parallel to the resistor 79 between the 75 and the point 80. At first the switches 90 and 91 will be closed, thereby short-circuiting the resistor 79 so that the entire line voltage is impressed across the armature 81 thus allowing the motor to accelerate rapidly. When the above-mentioned first control speed is reached, the switch 90 opens so that the resistor 79 will be short-circuited only so long as the contact 88 is in engagement with the brush 93, i.e., approximately half of the time. If the speed of the motor then increases until it reaches the above-mentioned second control speed, the switch 91 will also open so that the resistor 79 will no longer be short-circuited at any time. Thus, with the resistor 79 in constant series-circuit with the armature 81, the motor will slow down until the switch 91 again closes, so that the motor will finally attain a constant speed intermediate the first and second control speeds, which constant speed, as in the above embodiments, is substantially equal to the speed at which the motor runs during synchronous operation of the two units.

It will be understood that each of the elements described above, or two or more together, may also find a useful application in other types of sound projector arrangements differing from the types described above.

While the invention has been illustrated and described as embodied in a sound projector arrangement wherein the film projecting unit incorporates two rotational speed responsive switches, it is not intended to be limited to the details shown, since various modifications and structural changes may be made without departing in any way from the spirit of the present invention. For example, the speed of the film projecting unit may be governed by but one rotational speed responsive switch, or, if two such switches are actually provided, only one of these switches need be used in the control circuit for synchronizing the operation of the film projecting and sound reproducing units.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a projector arrangement, in combination, a sound reproducing unit; a film projecting unit including an electric drive motor and at least one resistor connected in circuit with said motor in such a manner that the speed thereof may be controlled by short circuiting said resistor, said units being electrically connectable to and disconnectable from each other so that when disconnected said film projecting unit may be used as an independent unit for projecting a film; and combined synchronizing and speed governing means for connecting and disconnecting said motor and said resistor so that said motor is rapidly synchronized to the speed of said sound reproducing unit and for maintaining said motor substantially at said synchronized speed when said units are electrically connected, and for also connecting and disconnecting said resistor and said motor, when said units are disconnected from each other, in such a manner that the motor is brought up rapidly to a speed substantially equal to said synchronized speed and for automatically maintaining the speed of said motor substantially at said speed.

2. In a projector arrangement, in combination, a sound reproducing unit; a film projecting unit including an electric drive motor and at least one resistor connected in circuit with said motor in such a manner that the speed thereof may be controlled by short circuiting said resistance, said units being electrically connectable to and disconnectable from each other so that when disconnected said film projecting unit may be used as an independent unit for projecting a film; and combined synchronizing and speed governing means including a first interrupter associated with said sound reproducing unit and moving between open and closed positions at a rate dependent upon the sound reproducing speed of said sound reproducing unit, a second interrupter mechanically connected to said motor of said film projecting unit and moving between open and closed positions at a rate dependent upon the rotational speed of said motor, and switch means responsive to the speed of said motor for connecting and disconnecting said resistor and said motor so that said motor is rapidly synchronized to the speed of said sound producing unit and for connecting and disconnecting said first and second interrupters to said motor for maintaining said motor substantially at said synchronized speed when said units are electrically connected, and also for connecting and disconnecting said resistor and said motor, when said units are disconnected from each other, in such a manner that the motor is brought up rapidly to a speed substantially equal to said synchronized speed and for connecting and disconnecting said second interrupter and said motor for automatically maintaining the speed of said motor substantially at said speed.

3. In a projector arrangement, in combination, a sound reproducing unit; a film projecting unit including an electric drive motor and a resistor in series with the rotor of said motor so that the speed thereof may be controlled by short circuiting said resistance, said units being electrically connectable to and disconnectable from each other so that when disconnected said film projecting unit may be used as an independent unit for projecting a film; and combined synchronizing and speed governing means including a first interrupter associated with said sound reproducing unit and moving between open and closed positions at a rate dependent upon the sound reproducing speed of said sound reproducing unit, a second interrupter mechanically connected to said motor of said film projecting unit and moving between open and closed positions at a rate dependent upon the rotational speed of said motor, a first normally closed switch responsive to the rotational speed of said motor and opening when said motor rotates at a speed slightly below a speed in synchronization with the speed of said sound reproducing unit, and a second normally closed switch responsive to the rotational speed of said motor and opening when said motor rotates at a speed slightly above said synchronized speed, said switches being connected in circuit with said motor, said interrupters and said resistor for first short circuiting said resistor so that said motor is rapidly synchronized to the speed of said sound reproducing means and for then connecting and disconnecting said first and second interrupters to said motor for maintaining said motor substantially at said synchronized speed when said units are electrically connected, and also for first short circuiting said resistor, when said units are disconnected from each other, so that the motor is brought up rapidly to a speed substantially equal to said synchronized speed and for then connecting and disconnecting said second interrupter in parallel to said resistor for automatically maintaining the speed of said motor substantially at said speed.

4. In a sound projector arrangement, in combination, a sound reproducing unit; a film projecting unit having an electric driving motor and speed reducing means in circuit with said driving motor; combined synchronizing and speed governing means for synchronizing the speed of sound reproduction and the speed of film projection and also for maintaining the rotational speed of said motor of said film projecting unit, when the latter is operated independently of said sound reproducing unit, substantially constant and equal to the speed normally obtained during synchronous operation of said units, said combined synchronizing and speed governing means including first and second interrupters which are electrically connectable to and disconnectable from each other, said first interrupter being associated with said sound reproducing unit and moving between open and closed positions at a rate dependent upon the sound reproducing speed of said sound reproducing unit and said second interrupter being mechanically connected to said motor of said film projecting unit and moving between open and closed positions at a rate dependent upon the rotational speed of said motor, first centrifugal switch means responsive to the rotational speed of said motor and occupying one position when said motor rotates slower than a first control speed which is slightly below normal synchronous speed and occupying the opposite position when said motor attains said first control speed, and second centrifugal switch means responsive to the rotational speed of said motor and occupying one position when said motor rotates slower than a second control speed which is slightly above normal synchronous speed and occupying the opposite position when said motor attains said second control speed said first and second centrifugal switch means being connected in series with each other and in circuit with said second interrupter; and operator controlled switch means movable between a first position in which said first interrupter is connected in circuit with the circuit formed by said second interrupter and said first and second centrifugal switch means for rendering said speed reducing means ineffective until said motor reaches said first control speed, and then rendering said speed reducing means ineffective only during the time said first and second interrupters are in one of the positions thereof and effective when said interrupters are in the other position thereof and for then rendering said speed reducing means effective when said motor reaches said second control speed, and a second position in which said first interrupter is disconnected from said circuit and in which said speed reducing means is rendered ineffective until said motor reaches said first control speed, for then rendering said speed reducing means ineffective only during the time said second interrupter is in one of the positions thereof and effective during the time said second interrupter is in the other position thereof until said motor reaches said second control speed and for then rendering said speed reducing means effective until said motor slows down again below said second control speed, whereby regardless whether the film projection unit is used as a separate unit or in conjunction with said sound reproducing unit, the motor of said film projection unit will be rapidly brought up to and maintained at a speed substantially equal to normal synchronous speed.

5. The combination defined in claim 4 wherein each of said interrupters comprises a plurality of stationary contacts, wherein detachable connecting means are provided for electrically connecting corresponding stationary contacts of said interrupters, wherein said second interrupter has a plurality of movable contacts corresponding in number to the number of stationary contacts at least one of said movable contacts of said second interrupter being in circuit with one of said switch means, and wherein means are provided for electrically connecting, whenever desired, at least one of said stationary contacts of said second interrupter in said circuit.

6. In a sound projector arrangement, in combination, a sound reproducing unit; a film projecting unit having an electric driving motor and at least one resistor connected in series-circuit therewith; combined synchronizing and speed governing means for synchronizing the speed of sound reproduction and the speed of film projection and also for maintaining the rotational speed of said motor of said film projecting unit, when the latter is operated independently of said sound reproducing unit, substantially constant and equal to the speed normally obtained during synchronous operation of said units, said combined synchronizing and speed governing means including a first interrupter associated with said sound reproducing unit and moving between open and closed positions at a rate dependent upon the sound reproducing speed of said sound reproducing unit, a second interrupter mechanically connected to said motor of said film projecting unit and moving between open and closed positions at a rate dependent upon the rotational speed of said motor, first centrifugal switch means responsive to the rotational speed of said motor and occupying a closed position when said motor rotates slower than a first control speed which is slightly below normal synchronous speed and occupying an open position when said motor attains said first control speed, and second centrifugal switch means responsive to the rotational speed of said motor and occupying a closed position when said motor rotates slower than a second control speed which is slightly above normal synchronous speed and occupying an open position when said motor attains said second control speed, said second interrupter and said first switch means being connected across each other, said second switch means being connected in series with the circuit formed by said second interrupter and first switch means, the circuit formed by said second interrupter and said first and second switch means being connected across said resistor; and operator controlled switch means movable between a first position in which said first interrupter is connected in parallel with said resistor and a second position in which said first interrupter is disconnected, whereby when said operator controlled switch means is in said first position said resistor is short-circuited by said first and second centrifugal switch means until said motor reaches said first control speed at which said first centrifugal switch means opens whereupon said resistor is short-circuited when said first interrupter is in closed position and when said second interrupter is in said closed position until said motor reaches said second control speed at which said second centrifugal switch means opens whereupon said resistor is short-circuited only when said first interrupter is closed, and whereby when said operator controlled switch means is in said second position said resistor is short-circuited until said motor reaches said first control speed at which said first centrifugal switch opens whereupon said resistor is short-circuited only when said interrupter is in closed position until said motor reaches said second control speed at which said second centrifugal switch means opens, so that regardless whether said film projecting unit is used as a separate unit or in conjunction with said sound reproducing unit, the motor of said film projecting unit will be rapidly brought up to and maintained at a speed substantially equal to normal synchronous speed.

7. The combination defined in claim 6, and additional switch means in circuit with said resistor for rendering, whenever desired, said first and second interrupters and said first and second switch means incapable of short-circuiting said resistor.

8. The combination defined in claim 6, and additional means for short-circuiting said resistor, whenever desired, independently of the action of said first and second interrupters and said first and second switch means.

9. In a sound projector arrangement, in combination, a sound reproducing unit; a film projecting unit having an electric driving motor and at least one resistor connected in parallel with the armature of said motor; combined synchronizing and speed governing means for synchronizing the speed of sound reproduction and the speed of film projection and also for maintaining the rotational speed of said motor of said film projecting unit, when the latter is operated independently of said sound reproducing unit, substantially constant and equal to the speed normally obtained during synchronous operation of said units, said combined synchronizing and speed governing means including a first interrupter associated with said sound reproducing unit and moving between open and closed positions at a rate dependent upon the sound reproducing speed of said sound reproducing unit, a second interrupter mechanically connected to said motor of said film projecting unit and moving between open and closed positions at a rate dependent upon the rotational speed of said motor, first switch means responsive to the rotational speed of said motor and occupying an open position when said motor rotates slower than a first control speed which is slightly below normal synchronous speed and occupying a closed position when said motor attains said first control speed, and second switch means responsive to the rotation speed of said motor and occupying an open position when said motor rotates slower than a second control speed which is slightly above normal synchronous speed and occupying a closed position when said motor attains said second control speed, said second interrupter and said second switch means being connected across each other, said first centrifugal switch means and the circuit formed by said second centrifugal interrupter and said second switch means being connected in series-circuit with each other; and operator controlled switch means movable between a first position in which said first interrupter is connected in series with said series circuit and in parallel with said resistor and a second position in which said first interrupter is disconnected and in which said series circuit is connected in parallel with said resistor, whereby when said operator controlled switch means is in said first position said resistor will remain connected in parallel with the armature of the motor until said motor reaches said first control speed at which said first centrifugal switch means closes whereupon said resistor will be short-circuited when said first and second interrupters are simultaneously in closed position until said motor reaches said second control speed at which said second centrifugal switch means closes whereupon said resistor is short-circuited whenever said first interrupter is in closed position and whereby when said operator controlled switch means is in said second position said resistor will remain connected in parallel with the armature of said motor until said motor reaches said first control speed at which said first centrifugal switch means closes whereupon said resistor will be short-circuited whenever said second interrupter is closed until said motor reaches said second control speed at which said second centrifugal switch means closes whereupon said resistor stays short-circuited until said motor is slowed down again below said second control speed so that regardless whether said film projection unit is used as a separate unit or in conjunction with said sound reproducing unit, the motor of said film projecting unit will be rapidly brought up to and maintained at a speed substantially equal to normal synchronous speed.

10. The combination as defined in claim 9 wherein said operator controlled switch means includes a third switch means movable between open and closed positions for connecting in closed position thereof the circuit formed by said first and second centrifugal switch means and said second interrupter in parallel with said resistor.

11. The combination defined in claim 10 wherein said third switch means is continuously urged to its closed position, and wherein means are provided for automatically moving said third switch means to its open position when said first interrupter is connected in series with said series circuit.

12. In a sound projector arrangement, in combination, a sound reproducing unit; a film projecting unit having an electric driving motor and at least one resistor connected in circuit with said motor in such a manner that the speed thereof may be controlled by short-circuiting said resistor; combined synchronizing and speed governing means for synchronizing the speed of sound reproduction and the speed of film projection and also for maintaining the rotational speed of said motor of said film projecting unit, when the latter is operated independently of said sound reproducing unit, substantially constant and equal to the speed normally obtained during synchronous operation of said units, said combined synchronizing and speed governing means including first and second interrupters which are electrically connectable to and disconnectable from each other, said first interrupters being associated with said sound reproducing unit and moving between open and closed positions at a rate dependent upon the sound reproducing speed of said sound reproducing unit and said second interrupter having a pair of contacts and being mechanically connected to said motor of said film projecting unit and moving between open and closed positions at a rate dependent upon the rotational speed of said motor, first centrifugal switch means responsive to the rotational speed of said motor and occupying one position when said motor rotates slower than a first control speed which is slightly below normal synchronous speed and occupying the opposite position when said motor attains said first control speed, and second centrifugal switch means responsive to the rotational speed of said motor and occupying one position when said motor rotates slower than a second control speed which is slightly above normal synchronous speed and occupying the opposite position when said motor attains said second control speed, said first and second centrifugal switch means being connected in series with each other and across the contacts of said second interrupter; operator controlled switch means movable between a first position in which said first interrupter is connected in series with the circuit formed by said second interrupter and said first and second centrifugal switch means and in which said series circuit is connected in parallel to said resistor and a second position in which said first interrupter is disconnected and said circuit formed by said second interrupter and said first and second centrifugal switch means is connected in parallel to said resistor, whereby when said operator controlled switch means is in said first position, said resistor will be short-circuited when said first interrupter is in closed position until said motor reaches said first control speed at which said first centrifugal switch means opens whereupon said resistor is short-circuited only when said first interrupter forms a closed circuit with said second interrupter and said second centrifugal switch means until said motor reaches said second control speed at which said second centrifugal switch means opens whereupon said resistor remains actively connected in series with said motor so as to reduce the speed thereof below said second control speed and whereby when said operator controlled switch means is in said second position said resistor is short-circuited until said motor reaches said first control speed at which said first centrifugal switch means opens whereupon said resistor is short-circuited only when said second interrupter forms a closed circuit with said second centrifugal switch means until said motor reaches said second control speed at which said second centrifugal switch means opens whereupon said resistor remains actively connected in series with said motor so as to reduce the speed thereof below said second control speed, so that regardless whether said film projecting unit is used as a separate unit or in conjunction with said sound reproducing unit, said motor of said film projecting unit will be rapidly brought up to and maintained at a speed substantially equal to normal synchronous speed; and means associated with said sound reproducing unit and incorporated in said circuit for automatically energizing and deenergizing said motor of said film projecting unit, said last-mentioned means including relay means for connecting said motor to and disconnecting the same from a source of electrical energy, electrical means energizable by said source for actuating said relay, and additional switching means for electrically connecting said electrical means to said source whenever said relay is to be actuated.

References Cited in the file of this patent

UNITED STATES PATENTS

| | | |
|---|---|---|
| 993,610 | Mathehot et al. | May 30, 1911 |
| 1,334,868 | Laycock | Mar. 23, 1920 |
| 2,693,127 | Ortman | Nov. 2, 1954 |

FOREIGN PATENTS

| | | |
|---|---|---|
| 341,152 | Great Britain | Jan. 15, 1931 |
| 1,101,732 | France | Apr. 27, 1955 |